United States Patent [19]

Conroy

[11] Patent Number: 5,378,279
[45] Date of Patent: Jan. 3, 1995

[54] ENHANCED CEMENT MIXED WITH SELECTED AGGREGATES

[76] Inventor: Michel Conroy, 8B, rue de Franche-Comte, 39100 Dole, France

[21] Appl. No.: 965,296

[22] PCT Filed: Aug. 12, 1991

[86] PCT No.: PCT/FR91/00663
§ 371 Date: Feb. 8, 1993
§ 102(e) Date: Feb. 8, 1993

[87] PCT Pub. No.: WO92/02469
PCT Pub. Date: Feb. 20, 1992

[30] Foreign Application Priority Data

Aug. 10, 1990 [FR] France .................... 90 10267

[51] Int. Cl.⁶ .................................... C04B 24/00
[52] U.S. Cl. ........................ 106/719; 106/720; 106/724; 106/728; 106/729; 106/823; 106/DIG. 1
[58] Field of Search ........... 106/719, 720, 724, 641, 106/819, 823, 728, 729, DIG. 2; C04B 24/00

[56] References Cited

U.S. PATENT DOCUMENTS

| | | | |
|---|---|---|---|
| 4,054,462 | 10/1977 | Stude | 106/719 |
| 4,906,298 | 3/1990 | Natsuume et al. | 106/725 |
| 5,151,126 | 9/1992 | Ranc et al. | 106/719 |

FOREIGN PATENT DOCUMENTS

| | | | |
|---|---|---|---|
| 0021556 | 2/1984 | Japan | 106/641 |
| 0221352 | 10/1985 | Japan | 106/641 |
| 01916 | 3/1989 | WIPO | |

OTHER PUBLICATIONS

Chemical Abstracts, vol. 110, No. 9, abstract No. 159514g, C. Ostrowski et al., "Manufacture of self-leveling and quick-setting mortars, especially for flooring substrates on concrete", p. 340. (Aug. 17, 1988).

Chemical Abstracts, vol. 106, No. 14, abstract 107081m, A. Minami et al., "Grout composition", p. 316. (Sep. 11, 1986).

Chemical Abstracts, vol. 91, No. 16, abstract No. 127995n, K. Tamura et al., "Molded cement product with glass-like surface gloss", p. 290. (Feb. 6, 1979).

Chemical Abstracts, vol. 97, No. 22, abstract No. 187140p, N. Orleanskaya et al., "Hydraulic activity of calcium silicates in the presence of chromium (VI)-containing setting activators", p. 309. (1982).

Chemical Abstracts, vol. 95, No. 12, abstract No. 102030p. I. Teoreanu et al., "Chromia effect on hardening and properties of low-concentration cement refractory concretes", p. 263. (1980).

*Primary Examiner*—Mark L. Bell
*Assistant Examiner*—Paul Marcantoni
*Attorney, Agent, or Firm*—Sandler, Greenblum & Bernstein

[57] ABSTRACT

A cement enhanced to obtain a self-smoothing, self-levelling, non-shrinking mortar or concrete, consisting of an artificial cement mixed with additives, including at least a combination of a plasticizing agent included in a proportion of between 0.5 and 4% of the weight of the artificial cement and an expanding agent included in a proportion of between 0.000001 and 0.00099% of the weight of the artificial cement, and mortar or concrete obtained with the enhanced binder, mixed with a filler consisting of aggregates with a selected particle size.

22 Claims, No Drawings

ENHANCED CEMENT MIXED WITH SELECTED AGGREGATES

BACKGROUND OF THE INVENTION

1. Field of the Invention

The present invention concerns a cement- and additive-based binder which, mixed in combination with aggregates of carefully selected particle size on the one hand, and with mixing water on the other hand, allows a very fluid, easy-to-use, paste to be obtained, characterized by the fact that the paste is self-smoothing, self-levelling and presents hardly any shrinkage after the setting of the cement.

2. Discussion of Background Information

The traditional techniques for constructing screeds and slabs using hydraulic binders based on artificial cements, standard quality aggregates and water, are well known. The pastes thus obtained, of variable consistency, are generally applied to rough substrates and take several hours to set, after hydration of the cement, and produce flat, smooth surfaces at the cost of numerous difficult secondary operations carried out after the cement has been spread. It is well known that such pastes are normally relatively firm and even plastic, and the handling of these pastes, whether mixing, transport, spreading or smoothing, can be partially mechanized or entirely manual, in accordance with techniques perfectly known to the tradesman.

It is also known that the mechanical characteristics of structures obtained using such binders, even if they correspond to standards in force, lack reliability in the long term, and it is very commonly observed that many structures suffer major damage during the ten-year guarantee period, notably due to the considerable hydraulic shrinkage and the low mechanical strengths resulting from these traditional mixes. It will also be noted that, because of these technical problems, it is often necessary, in order to meet floor covering requirements, to cover screeds or slabs with smoothing coats, in order to obtain satisfactory evenness.

More generally, it is well known that, whatever the techniques used, no screed or slab constructed in a traditional manner has all the following three essential characteristics, especially when large surfaces, exceeding 100 or 200 square meters in one block, are involved.

The first characteristic, and without a doubt the most important, concerns hydraulic shrinkage of the slab or screed constructed using the customary cements. For example, it is known that in the case of a totally classical mortar, hydraulic shrinkage is of the order of 1 millimeter per linear meter, in all directions.

This shrinkage, in time, causes microscopic fissures, hairline cracks and other local ruptures or dissociations, which seriously alter the overall mechanical properties of the slab or screed. In actual fact, this problem of shrinkage can be totally catastrophic, particularly in the case of structures with large surface areas, whose mechanical reliability may prove inadequate after the usual guarantee periods have expired, thus causing major losses.

The second characteristic concerns the evenness or level of slabs and screeds, particularly in the event of treatment of large surface areas. This is a result, notably, of the inevitable imperfection of manual application of the paste, whatever tools are used and however great the skill of the professionals concerned.

The third characteristic concerns the smoothing of the slab or screed, to eliminate local imperfections or surface defects.

SUMMARY OF THE INVENTION

The object of the present invention is principally a mortar or concrete, based on traditional cement, to which several adjuvants are added in sufficient quantity and quality to confer on the mixture properties of self-levelling and self-smoothing, without any substantial subsequent shrinkage of the slab or screed, constructed using this mortar or concrete, after setting. It should be noted in this respect that self-levelling means the characteristic whereby mortar or concrete spread over a rough surface settles on its own to a horizontal level, without the intervention of any professional or any specific tool. Similarly, self-smoothing means the characteristic whereby the mortar or concrete spread over a rough surface takes on, on its own, a smooth or even surface, without the intervention of any professional or specific tool, except in the case of a special finish, for example to achieve a glazed surface.

Numerous proposals can be found in technical literature for producing in a cement, mortar or concrete, qualities of self-smoothing or self-levelling, or indeed for restricting hydraulic shrinkage before or after the said mortar, concrete or cement sets. This is notably the case of international application WO-89/01916 filed on Aug. 26, 1987 in the name of Oy Partek which recommends fabrication of a self-levelling mortar using special additives mixed with a binder such as cement, aggregates such as sand, and water. In his application, the applicant indicates that such mortars are known to be produced by adding plasticizers and expanding agents in proportions to be decided on a case by case basis. However, the applicant notes that the difficulty in respect of these compounds resides in mastering shrinkage at the time of drying when a mortar is spread over considerable continuous lengths.

According to his statements, the applicant proposes to increase the percentage of synthetic fibers such as polypropylene fiber in the composition of the mortar in order to avoid all problems of failure due to shrinkage of the mortar when it hardens. It was already known that fibers of the polypropylene type are a means of distributing shrinkage when they are used in proportions not exceeding a few thousandths of a percentage point of the weight of the total mass of mortar. However, the proportion of polypropylene fibers recommended by Oy Partek in his self-levelling mortar is, at the very least, considerably higher (0.05 to 3%), in total contradiction to the customary practices of the professional, who considers that such a proportion of synthetic fibers can only result in the opposite of plasticity and, consequently, in an effect opposite to self-smoothing and/or self-levelling in the material thus obtained. It will also be seen that, in view of the low density of these fibers (less than 0.9), it can reasonably be expected that they will tend to rise to the surface of the mortar, of which the average density (while aqueous) is around 2.2, giving the whole a rough appearance, and here again running counter to one of the aims sought in the invention, i.e., the self-smoothing capabilities of the same material. In addition, the product proposed in the international application recommends a certain number of ingredients to be included in particular proportions and this, on closer examination, proves to be either unrealizable or contrary to all universally known rules and practices. Such, for example, is the case of fly-ash which, when mixed with cement, produces a filler whose shrinkage is difficult to control. Similarly, the quality of the sand used to make the mortar seems not to matter, whereas its physical and chemical properties and particle-size distribution must be carefully selected to provide the whole with self-smoothing or self-levelling capabilities.

With regard to the main characteristic of the present invention, it has been possible to determine that the addition to a traditional cement, mortar or concrete, of given proportions of plasticizers and expanding agents, would confer on the structures created by mixing the resulting enhanced cement with classical or selected aggregates, the combination of the three desired properties: self-smoothing, self-levelling and no shrinkage. This result is achieved when a plasticizing agent is added to a hydraulic binder of hydraulic binder Portland type (for example grade 55) at the rate of between 0.5 and 4% of the weight of the cement, and an expanding agent in a proportion varying between 0.000001 and 0.00099% of the weight of the hydraulic binder.

In the case of cement enhanced in accordance with the invention, the plasticizing agents will act essentially by enabling the quantity of water necessary to make the paste to be very considerably reduced. It should be noted here that mechanical strength is inversely proportional to the void ratio of the mortar or concrete after its water has evaporated; it is known, in fact, that for 1% of vacuum in the concrete, its mechanical strength diminishes by 2%. It is therefore essential to replace the water with plasticizers, in such a way as to reduce the water parameter (and consequently conserve the maximum strength of the concrete), while ensuring that all of the cement, mortar or ready-to-place concrete has excellent pourability, with the desired characteristics of self-levelling and self-smoothing.

In the case of expanding agents, these are used as enhancers in the cement in accordance with the invention, to counterbalance with great precision the hydraulic shrinkage normally observed in all traditional concrete or mortar. It is also known that the shrinkage of a mortar or concrete varies considerably according to the quality and particle size distribution of the aggregates with which the mortar or concrete is mixed. It will be seen, in this respect, that the greatest efficiency, as far as the cement in this invention is concerned, will be achieved when it is mixed with selected aggregates as described hereafter. Residual shrinkage of the product made up of the cement and the aggregates will ultimately be counterbalanced by an expanding agent, the expansion of this agent being exactly equivalent to the foreseeable shrinkage of the product. The proportion of expanding agents used for cement enhanced in accordance with the invention naturally corresponds to this latter characteristic, while also having a short expansion period in order to prevent the expansion from continuing after the cement has set, which would obviously cause microscopic fissures which would be very damaging to the structure. It is perfectly evident that, in the case of cement enhanced in accordance with the invention, any plasticizing agent can be used, in particular the following products: sodium lignosulphonate, saccharose, sodium gluconate, sulphonic acids, sulphonated naphthalene formaldehyde, calcium lignosulphonate, carbohydrate, amino- or polyhydroxycarboxylic acids, or even sulphonated melamine which, moreover, appears to be the most satisfactory economic compromise.

Similarly, for the expanding agent used in combination in the cement in accordance with the invention, micronized powdered aluminium, of suitable fineness, has been chosen. It is evident that other expanding agents such as calcium carbide, quicklime, hydrogen peroxide, powdered iron, calcium hypochlorite, magnesium oxide, vinyl resin or even aluminium resin, may also be suitable, provided that the proportions are adjusted.

With regard to a second essential characteristic of the invention, optimum performances are obtained by mixing the cement containing the plasticizing and expanding agents described above with aggregates consisting essentially of siliceous sands with a particle size of between 0 and 4 mm, in accordance with the following distribution table:

| Particle size of aggregates (mm) | Distribution by weight (%) |
| --- | --- |
| 0 to 0.08 | 12 to 0 |
| 0.08 to 0.315 | 18 to 3.5 |
| 0.315 to 0.630 | 14 to 6.5 |
| 0.630 to 0.8 | 6 to 11.0 |
| 0.8 to 1 | 5 to 7.5 |
| 1 to 2 | 23 to 10.0 |
| 2 to 2.5 | 22 to 13.0 |
| 2.5 to 3.15 | 25.0 |
| 3.15 to 4 | 23.5 |

It has been possible to determine that this method of selecting aggregates in accordance with the table above, to mix with a traditional cement, provides the resulting mortar with remarkable qualities of plasticity, permitting an unexpected self-levelling effect to be obtained, while the mortar also has minimal shrinkage. This is a result of the highly compact grading of the aggregates, providing an extremely low void ratio, which considerably limits shrinkage and ensures extremely high characteristics of mechanical compressive strength for this type of mortar: over 40 MPa, whereas the strength of a traditional non-plasticized mortar is known not to exceed an average of 20 MPa (30 for plasticized mortars), with hydraulic shrinkage of the order of one millimeter per linear meter. A screed or slab constructed from cement enhanced in accordance with the invention, mixed with aggregates selected in accordance with the grading curve given above, naturally provides exceptional performance, particularly since it appears to be possible to construct surfaces in a single block of around 1000 square meters, without any substantial shrinkage, while retaining, or even increasing, the mechanical properties of the cement, mortar or concrete, and ensuring almost perfect self-levelling and self-smoothing of the structure in question.

Furthermore, the almost complete absence of hydraulic shrinkage due to the combined effect of the expanding agent and selection of the aggregates used, appears to be extremely advantageous on at least two counts: it means that shrinkage joints do not need to be placed, and embedded distribution reinforcement can be omitted.

Apart from the plasticizer/expanding agent combination which is characteristic of the cement, mortar or concrete of this invention, the different traditional adjuvants listed and described below can also be incorporated:

1) A water-retaining agent selected from the following active substances:
calcium abietate, polyvinyl acetate
sodium alginate, bentonite
stabilized casein, fly-ash
hydraulic lime, starch
kieselguhr, polyvinyl stearate.

By maintaining the water uniformly throughout the mass of the material, the retaining agent incorporated in accordance with the invention enables the proper mechanical and geometric characteristics of the slab constructed to be preserved, whatever the amount of water used during the mixing of the cement, concrete or mortar paste.

2) A colloidal agent, selected from the following active substances:
albuminoid, sodium alginate
starch, latex
carboxymethylcellulose, stabilized casein, cellulose
dextrin, tannin, starch.

Such an agent improves still further the pourability of the mortar or concrete paste, by ensuring that it has proper homogeneity during pouring, in other words, there is no breakage in the film and no separating out of the original ingredients.

3) A stabilizing agent, selected from the following active substances:
calcium abietate, clay
sodium bicarbonate or potassium bicarbonate
alumina colloid, fly-ash
hydraulic lime, cellulose ether
sodium silicate.

Such an additive helps to stabilize the plasticizer/expanding agent combination in accordance with the invention, and thus to preserve and prolong its activity. This increases the period of workability of the fresh mortar, during which the above-mentioned characteristics of self-levelling and self-smoothing are effective.

4) A retarder to delay gelling and setting, selected from the following active substances:
gluconic acid, phosphoric acid
salicylic acid, hydroxycarboxylic acids, starch, amines
clays, borax, sugars, lignosulphonates.

Such an agent or additive increases the self-smoothing effect of a cement in accordance with the invention, in particular by avoiding the phenomenon of "wrinkles" on the surface of the skin of the fresh mortar, while it is being placed. 5) A hardening catalyst, selected from the following active substances:
lithium carbonate, lithium chloride
sodium aluminate, sodium sulphate.

In the usual manner, such an additive accelerates and increases the hardening power of the hydraulic binder included in the mortar or concrete, which allows the slabs and screeds constructed in accordance with the invention to be used sooner, and improves their mechanical characteristics still further.

6) An anti-foaming agent, selected from the following active substances:
fat alcohols, light alcohols, polyoxethylene alkyphenol
hydrocarbon emulsions, nonylphenol, tributyl phosphate
butyl phtalate, degraded proteins, silicones
butyl stearate.

In the usual manner, such an additive or agent eliminates any foaming and bubbles resulting from air entrainment during mixing, transport and handling of the concrete or mortar paste, and does not adversely affect the smooth appearance of screeds and slabs constructed in accordance with the invention.

7) A waterproofing agent, selected from the following active substances:
albumen, caprylic acid, capric acid, oleic acid
sodium alginate, alum, starch, sodium carbonate, potassium carbonate
bentonite, fly-ash, fat limes, colophony.

In the usual manner, such an additive renders waterproof the screeds and slabs constructed in accordance with the invention, by preventing water and hydrocarbons from penetrating into the material.

8) A bonding agent, selected from the following active substances:
propionate copolymer, polyvinyl chloride
polyvinyl acetate, starch, latex, carboxymethyl cellulose
stabilized casein, fat limes, methyl cellulose, gelatin.

In the usual manner, after the slabs have dried out, such an additive increases the bonding of the latter to the substrates to which they are applied.

With regard to the description above, one of the active substances identified may, of course, simultaneously fulfill several of the above-mentioned functions.

Finally, it is evident that other hydraulic binders or other aggregates could be used to achieve the results sought by the present invention, provided, of course, that the proportions are adjusted within the brackets which have been given above.

In the case of hydraulic binders, different materials may be selected to mix with the enhancing agents complying with the invention; among these are: Portland cement, blast furnace cements, high-alumina cement, anhydrous calcium sulphate, gypsum, metakaolin.

In the case of aggregates, different customary materials may be used to mix with the enhancing agents complying with the invention; these include: siliceous, calcareous, granitic, and basaltic aggregates, ferrophosphorus, ferrosilicon, barytes, magnetite, goethite and zircon. Stronger materials, synthetics in particular, may also be used, such as corundum, silicon carbide, boron carbide, metal flakes, granite, sandstone, quartz, silex, marble, porphyry.

The aggregates may be improved by mixing with the enhancing agents complying with the invention active substances ensuring continuous grading for the paste or mortar. Among these active additives are fly-ash and float-ash, pozzolanas, slag, calcareous fillers such as calcium carbonate, basalt, kieselguhr, bentonite. Inert additives may also be used, i.e., simply to coat the aggregates, such as silica vapors.

DETAILED DESCRIPTION OF THE PREFERRED EMBODIMENT

For a preferred example of the production of mortar or concrete by mixing (for example using equipment as described hereafter) a cement enhanced, in accordance with the invention, with fillers and aggregates, a composition is proposed below which allows the three characteristics of the mortars or concrete, as per the invention, to be achieved simultaneously.

In order to produce one cubic meter of mortar, the following are poured into a mixer, mobile or otherwise: 300 kilos of cement, for example grade 55 Portland type, with spheroidal fillers such as fly-ash, at the rate of 400 kilos, aggregates composed of siliceous sand with a particle size varying between 0 and 4 millimeters, with a distribution complying exactly with the curve proposed above, at the rate of 1428 kilos; these materials mixed with water produce a paste with maximum plasticity, allowing self-levelling and minimum hydraulic shrinkage to be achieved.

In accordance with the invention, a plasticizer is C then added at the rate of 7 kilos, being in fact a sodium sulphonate polynaphthalene, to which is further added 0.8 kg of sodium thiosulphate to cancel out the setting delay which this type of plasticizer causes, and an expanding agent, micronized powdered aluminium, at the rate of 18 grams, to which 0.5 kg, or more, of potassium bichromate is added (possibly replaced by chromic oxide which, however, is insoluble or not very soluble in water), in order that the mortar produced can be worked for one hour, or even longer, before the commencement of expansion which, otherwise, would start a few minutes after hydration of the mortar, to end approximately one hour later; these materials are then mixed with 200 kilos of water to obtain the final paste.

Under these conditions, the paste presents all the characteristics of virtually no shrinkage, almost perfect self-levelling and exceptional self-smoothing. Such a mortar can also receive secondary additives allowing the characteristics to be optimized according to its end use, as mentioned above, and can be poured continuously, to a predetermined level, to construct slabs, screeds, microscreeds and, more generally, all surfaces or floors intended for residential, tertiary, public and industrial buildings, for both internal and external works, in dry or damp premises.

I claim:

1. A cement for making a ready-to-use, self-smoothing, self-leveling and non-shrinking mortar or concrete, comprising:
a hydraulic binder, a plasticizing agent present in an amount of between 0.5 and 4% by weight of the hydraulic binder, and an expanding agent present in an amount of between 0.000001 and 0.00099% by weight of the hydraulic binder.

2. The cement according to claim 1, wherein said plasticizing agent is selected from the group consisting of a sulphonated melamine-formaldehyde compound, sodium lignosulphonate, saccharate, sodium gluconate, sulphonic acids, a sulphonated naphthalene formaldehyde compound, calcium lignosulphonate, carbohydrates, amino acids and polyhydroxycarboxylic acids.

3. The cement according to claim 1, wherein said expanding agent is selected from the group consisting of calcium sulphate, powdered aluminum, calcium carbide, quicklime, hydrogen peroxide, powdered iron, calcium hypochlorite, magnesium oxide, vinyl resin and alumina.

4. The cement according to claim 1, further comprising at least one adjuvant selected from the group consisting of a gelling retarder, a stabilizer, a colloidal agent and a water retention agent.

5. The cement according to claim 4, wherein said gelling retarder is selected from the group consisting of gluconic acid, phosphoric acid, salicylic acid, hydroxycarboxylic acid, starch, amines, clays, borax, sugars and lignosulphonates.

6. The cement according to claim 4, wherein said stabilizer is selected from the group consisting of calcium abietate, clay, sodium bicarbonate, potassium bicarbonate, alumina colloid, fly-ash, hydraulic lime, cellulose ether and sodium silicate.

7. The cement according to claim 4, wherein said colloidal agent is selected from the group consisting of albuminoid, sodium alginate, latex, carboxymethylcellulose, stabilized casein, cellulose, dextrin, tannin and starch.

8. The cement according to claim 4, wherein said water-retention agent is selected from the group consisting of calcium abietate, polyvinyl acetate, sodium alginate, bentonite, stabilized casein, fly-ash, hydraulic lime, starch, kieselguhr and polyvinyl stearate.

9. A ready-to-use, self-smoothing, self-leveling and non-shrinking mortar or concrete comprising the cement according to claim 1, water and a filler comprising at least one aggregate.

10. The mortar or concrete according to claim 9, wherein said at least one aggregate has a particle size of between 0 and 4 millimeters in diameter.

11. The mortar or concrete according to claim 9, wherein the particle size distribution of said at least one aggregate is as follows:

| Particle size of aggregates (mm) | | Distribution by weight (%) |
|---|---|---|
| 0 to 0.08 | = | 12 to 0 |
| 0.08 to 0.315 | = | 18 to 3.5 |
| 0.315 to 0.630 | = | 14 to 6.5 |
| 0.630 to 0.8 | = | 6 to 11 |
| 0.8 to 1 | = | 5 to 7.5 |
| 1 to 2 | = | 23 to 10 |
| 2 to 2.5 | = | 22 to 13 |
| 2.5 to 3.15 | = | 25 |
| 3.15 to 4 | = | 23.5. |

12. The mortar or concrete according to claim 11, comprising, per cubic meter of said mortar or concrete:
300 kilos of Portland cement,
400 kilos of fly-ash,
1428 kilos of said at least one aggregate, wherein said at least one aggregate is siliceous sand,
7 kilos of said plasticizing agent, wherein said plasticizing agent comprises sodium sulphonate polynaphthalene,
18 grams of said expanding agent, wherein said expanding agent comprises micronized, powdered aluminum, and
200 kilos of water.

13. The mortar or concrete according to claim 9, further comprising 0.8 kg sodium thiosulfate per cubic meter of said mortar or concrete.

14. The mortar or concrete according to claim 9, further comprising 0.5 kg potassium bichromate per cubic meter of said mortar or concrete.

15. The mortar or concrete according to claim 9, further comprising 0.5 kg chromic oxide per cubic meter of said mortar or concrete.

16. A method of making a ready-to-use, self-smoothing, self-leveling and non-shrinking mortar or concrete comprising mixing the cement according to claim 1 with water and a filler comprising at least one aggregate.

17. The method of making a ready-to-use, self-smoothing, self-leveling and non-shrinking mortar or concrete according to claim 16, wherein said at least one aggregate has a particle size of between 0 and 4 millimeters in diameter.

18. The method of making a ready-to-use, self-smoothing, self-leveling and non-shrinking mortar or concrete according to claim 16, wherein the particle size distribution of said at least one aggregate is as follows:

| Particle size of aggregates (mm) | | Distribution by weight (%) |
| --- | --- | --- |
| 0 to 0.08 | = | 12 to 0 |
| 0.08 to 0.315 | = | 18 to 3.5 |
| 0.315 to 0.630 | = | 14 to 6.5 |
| 0.630 to 0.8 | = | 6 to 11 |
| 0.8 to 1 | = | 5 to 7.5 |
| 1 to 2 | = | 23 to 10 |
| 2 to 2.5 | = | 22 to 13 |
| 2.5 to 3.15 | = | 25 |
| 3.15 to 4 | = | 23.5. |

19. The method of making a ready-to-use, self-smoothing, self-leveling and non-shrinking mortar or concrete according to claim 18, comprising adding, per cubic meter of said mortar or concrete:

300 kilos of Portland cement, 400 kilos of fly-ash, 1428 kilos of said at least one aggregate, wherein said at least one aggregate is siliceous sand, 7 kilos of said plasticizing agent, wherein said plasticizing agent comprises sodium sulphonate polynaphthalene, 18 grams of said expanding agent, wherein said expanding agent comprises micronized, powdered aluminum, and 200 kilos of water.

20. The method of making a ready-to-use, self-smoothing, self-leveling and non-shrinking mortar or concrete according to claim 16, further comprising adding 0.8 kg sodium thiosulfate per cubic meter of said mortar or concrete.

21. The method of making a ready-to-use, self-smoothing, self-leveling and non-shrinking mortar or concrete according to claim 16, further comprising adding 0.5 kg potassium bichromate per cubic meter of said mortar or concrete.

22. The method of making a ready-to-use, self-smoothing, self-leveling and non-shrinking mortar or concrete according to claim 16, further comprising adding 0.5 kg chromic oxide per cubic meter of said mortar or concrete.

* * * * *

UNITED STATES PATENT AND TRADEMARK OFFICE
CERTIFICATE OF CORRECTION

PATENT NO. : 5,378,279
DATED : January 3, 1995
INVENTOR(S) : Michael CONROY

It is certified that error appears in the above-indentified patent and that said Letters Patent is hereby corrected as shown below:

On the cover page, item [56], line 3 under Foreign Patent Documents, change "01916" to ---89 01916---.

At column 3, line 18, change "a hydraulic binder of hydraulic binder" to ---a hydraulic binder of---.

At column 3, line 19, change "Portland type" to ---Portland type cement---.

At column 3, line 20, change "cement" to ---hydraulic binder---.

At column 5, line 49, begin a new paragraph on the next line with ---5) A hardening catalyst, se- ---.

Signed and Sealed this

Twelfth Day of December, 1995

Attest:

BRUCE LEHMAN

Attesting Officer

Commissioner of Patents and Trademarks